United States Patent

[11] 3,630,001

| [72] | Inventor | Frank D. Hamerski<br>Milwaukee, Wis. |
|---|---|---|
| [21] | Appl. No. | 817,874 |
| [22] | Filed | Apr. 21, 1969 |
| [45] | Patented | Dec. 28, 1971 |
| [73] | Assignee | A. O. Smith Corporation<br>Milwaukee, Wis. |

[54] ATMOSPHERIC CONTROL APPARATUS FOR A SEALED STORAGE STRUCTURE
4 Claims, 2 Drawing Figs.

[52] U.S. Cl. .................................................. 55/158, 99/235
[51] Int. Cl. ..................................................... B01d 53/22, A01f 7/04
[50] Field of Search .......................................... 55/16, 158; 52/192; 99/153, 235

[56] References Cited
UNITED STATES PATENTS
3,097,916 7/1963 Dawson et al. ............... 99/235
3,165,054 1/1965 Behlen et al. .................. 99/235
3,256,675 1/1966 Robb ............................ 55/16

Primary Examiner—Charles N. Hart
Attorney—Andrus, Sceales, Starke & Sawall

ABSTRACT: A sealed storage system such as a silo having a breathing system including a flexible pressure-responsive member having one surface exposed to the pressure within the silo and the opposite surface exposed to atmospheric pressure. An atmosphere control apparatus is provided and includes a gas separator through which gas from the structure is circulated. The separator includes a series of membranes which selectively separate oxygen from the gas so that substantially oxygen-free gas is returned to the storage structure. The atmosphere control apparatus supplies the oxygen-free gas through a reservoir that also contains the silo breathing system.

PATENTED DEC 28 1971 3,630,001
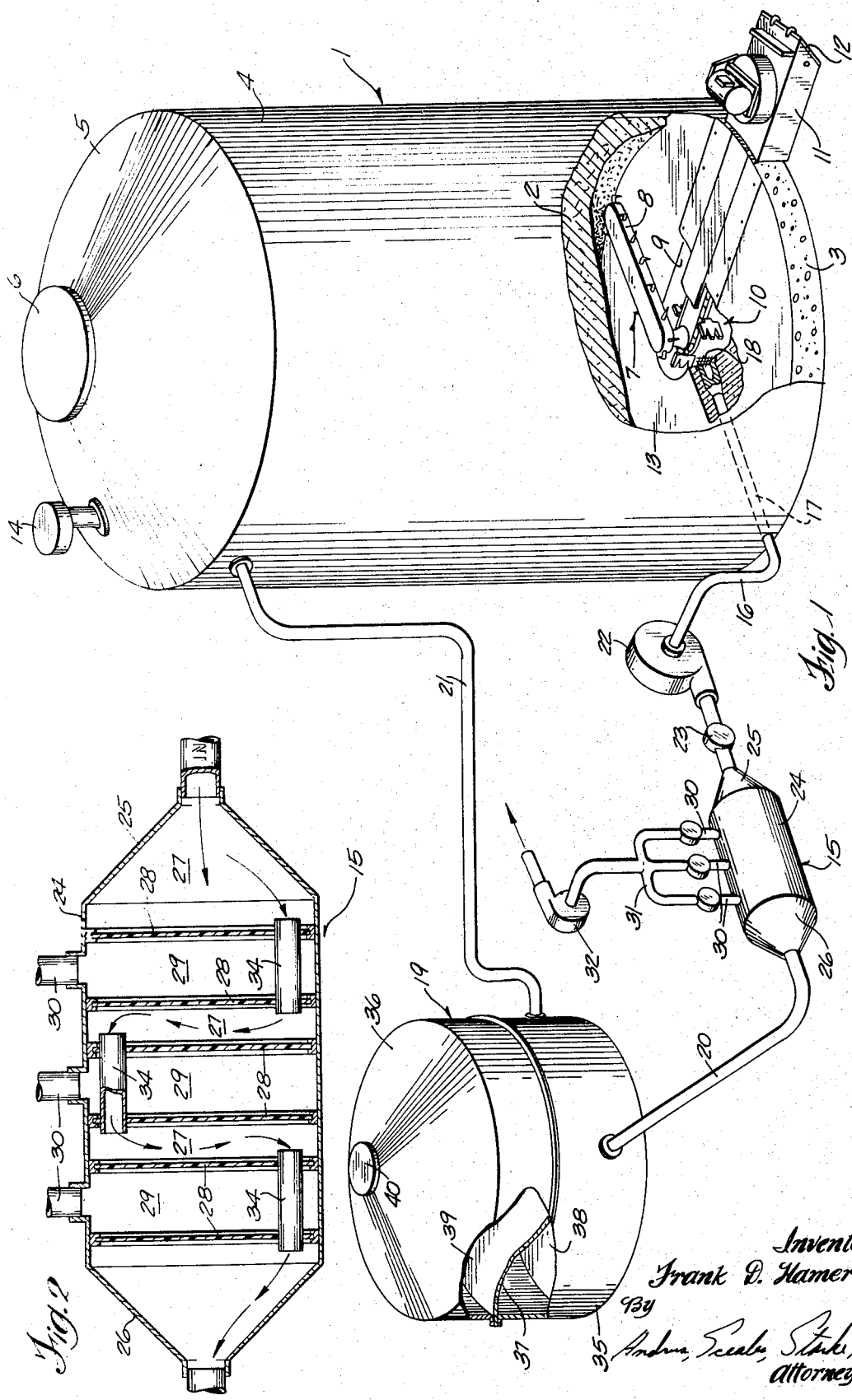
Inventor
Frank D. Hamerski
By
Andrus, Sceales, Starke & Sawall
Attorneys

ATMOSPHERIC CONTROL APPARATUS FOR A SEALED STORAGE STRUCTURE

The invention relates to a storage unit and more particularly to a sealed storage unit having an atmosphere control system.

Sealed storage structures such as silos are used to store materials which are subject to spoilage due to contact with oxygen in the air. With the use of a sealed silo, pressure differentials will occur between the interior and exterior of the silo. Gas being generated by the stored material, variations in ambient temperature, and normal atmospheric pressure changes all contribute to these pressure differentials. As a large pressure differential between the exterior and interior of the silo can cause destructive stresses in its walls, a relief valve is usually provided on the roof of the silo. The relief valve allows air to flow into or out of the silo to balance the pressure differential whenever a predetermined differential is reached.

To balance small pressure differentials less than the maximum required to actuate the relief valve, a pressure responsive breather system is usually provided. The breather system can include a breather bag having one surface exposed to atmospheric pressure and the opposite surface exposed to the interior pressure of the silo. By expanding and contracting, the breather bag tends to equalize the internal and external pressures.

Although silos of this type are sealed, some air necessarily gains entrance to the structure. For example, sealed silos usually employ a bottom unloading unit similar to that shown in the Tiedemann U.S. Pat. No. 2,635,770, for purposes of dislodging and discharging the stored material. During the unloading operation, particularly if the interior of the silo is at a negative pressure with respect to the atmosphere, air may enter the silo through the unloading door. Moreover, air may also enter the silo due to leakage in the sealed structure itself, or if extreme pressure differentials are encountered the relief valve normally used with the silo may admit air to the silo to equalize the extreme pressure differential. Therefore small amounts of air can gain entrance to the sealed silo, causing spoilage and decomposition of the stored material.

Because of the possibility of some spoilage in the sealed silo, it is desirable to have an atmosphere control system for the interior of the silo. However, atmosphere control systems previously used were expensive and did not have sufficient capacity to operate properly under more extreme pressure differentials.

The present invention is directed to an atmosphere control system which works in combination with a conventional breather apparatus, is inexpensive to operate yet efficient, and has a reserve capacity to account for extreme conditions. The atmosphere control system includes an apparatus for circulating gas from the silo through a separator unit which utilizes a permeable membrane, or series of permeable membranes, to selectively separate oxygen from the gas. The separator unit discharges nitrogen-rich and oxygen-poor gas into the interior of the storage structure. The gas circulating apparatus not only conveys gas to the separator unit but also maintains a positive pressure relative to the atmosphere in the entire storage unit, thus keeping air from entering the silo. A gas storage tank is provided in the system and serves as a reservoir to provide a reserve supply of oxygen-depleted gas at times when sudden changes of the pressure within the storage structure demand more gas to maintain a positive pressure to keep air from entering.

The drawings illustrate the best mode presently contemplated of carrying out the invention.

In the drawings:

FIG. 1 is a schematic diagram showing an embodiment of the invention; and

FIG. 2 is a vertical section of the gas separator unit of the invention.

The drawings illustrate a sealed storage structure or silo 1, which is adapted to contain a perishable material 2, such as silage, haylage, shelled corn, grain or the like. Silo 1 is supported on a foundation 3 and includes a generally cylindrical wall 4 having an open top which is enclosed by a roof 5. The stored material 2 is introduced into the silo through an opening 6 in roof 5, and an unloader unit 7 is located in the bottom of the silo. Unloader unit 7 is a commonly used type, such as that disclosed in the Tiedemann U.S. Pat. No. 2,035,770 and includes a cutter arm 8 journaled for rotation about the center of the foundation and disposed to rotate over the foundation 3. Cutter arm 8 serves to cut or dislodge the silage as it rotates, and moves the dislodged silage to the center of the silo where it falls into a radially extending through 9 formed in foundation 3. A conveyor unit 10 is mounted within trough 9 and extends through a housing 11 attached to the exterior of the silo. The outer end of the housing is provided with a hinged door 12. Conveyor unit 10 operates to discharge silage to the exterior of the silo through door 12, which is opened during operation. When the stored material 2 is fibrous in nature, such as silage, the stored material will tend to "arch over" and form cavity 13 in the lower end of the silo.

To allow partial balancing of extreme pressure differentials which occur between the interior and the exterior of the silo, a relief valve 14 is provided in roof 5. When the pressure in the silo exceeds the atmospheric pressure by a predetermined maximum, relief valve 14 opens to permit air flow out of the silo. Conversely, when the atmospheric pressure exceeds the pressure of the interior by a predetermined amount, valve 14 opens to allow airflow into the silo.

According to the invention an atmosphere control system is sued in conjunction wit the sealed silo to maintain oxygen-depleted gas within the silo, The atmosphere control system includes a gas separator unit 15 which is connected to the lower end of the silo by a conduit 16. As shown in FIG. 1, the conduit 16 is connected to a passage 17 formed in the foundation 3 an the inner end of the passage 17 communicates with the central portion of the trough 9. To prevent the stored material from entering the passage 17, a screen or other perforated member 18 is located across the open end of the passage 17.

The outlet of separator unit 15 is connected to a reservoir or tank 19 by conduit 20 and the outlet of the tank is connected by a conduit 21 to the headspace of the silo 1. With this construction, the interior of the silo 1, passage 17, conduit 16, separator unit 15, conduit 20, tank 19 and conduit 21, provide a closed flow system for the circulation of gas. The gas is circulated within this closed flow system by a blower 22 which is located within the conduit 16, and a check valve 23 is also located in the conduit 16 to prevent the reverse flow of gas within the closed system.

The gas gas separator 15 can be a commercially available type which utilizes a permeable membrane capable of separating oxygen from other gases, such as that shown in the U.S. Pat. Robb No. 3,256,675. More specifically, the gas separator unit 15 as shown in FIG. 2 includes a generally cylindrical outer wall 24 or shell which is closed at one end by an inlet head 25 and at the opposite end by an outlet head 26. The cylindrical shell 24 is divided into a series of chambers 27 by a plurality of permeable membranes 28. As described in U.S. Pat. No. 3,256,675, the membranes can be composed of a thin nonporous polycarbonate resin which is preferentially permeable to oxygen.

Each pair of membranes 28 defines an exhaust chamber 29 which is connected by a conduit 30 to a manifold 31 and the manifold is connected to the suction or inlet side of a blower 32 so that the vacuum condition existing in exhaust chamber 29 will accelerate the permeation of oxygen through the membranes 28.

To permit the oxygen-depleted gas to pass from one of the chambers 27 to the next, tubes 34 are disposed within each pair of membranes 28 and provide a passage which establishes communication between the chambers 27. The gas discharged from the last of the series of chambers 27 to tank 19 is oxygen-poor and nitrogen-rich.

The tank 19 serves as a reservoir or reserve for the nitrogen-rich gas and includes a generally cylindrical wall 35 is which is enclosed by a roof 36. A pressure responsive member 37, such as a flexible diaphragm is located across the wall 35 and divides the tank into a lower chamber 38 and an upper chamber 39. Vent 40 located in the roof 36 provides communication between the upper chamber 39 and the atmosphere.

As the upper surface of the diaphragm 37 is exposed to the atmosphere and the lower surface of the diaphragm is exposed to the pressure of the nitrogen-rich gas in the lower chamber 38, the diaphragm will tend to balance pressure differentials that exist between the closed system and the atmosphere. For example, if the atmospheric pressure increases, the diaphragm 37 will flex downwardly to equalize the pressures. Conversely, if atmospheric pressure is reduced in comparison to the pressure of the closed system, the diaphragm 37 will flex upwardly to equalize the pressure differential.

In operation, gas from the silo 1, is drawn through the conduit 16 by the blower 22 and is introduced into the first of a series of chambers 27 of the separator unit 15. As the membranes 28 are preferenitally permeable to oxygen, the oxygen molecules will ten to pass through the membrane at a faster rate than the nitrogen molecules with the result that the gas within the exhaust chamber 29 will be oxygen-poor and the gas within the chambers 27 will be nitrogen-rich. The blower 32 increases the pressure differential across the membranes 28 thereby increasing or accelerating the rate of permeation of the oxygen molecules.

Each of the chambers 27, in a direction from the inlet to the outlet, will have a progressively greater nitrogen content and a lesser oxygen content so that the gas being discharged from the last of the series of chambers 27 will have a relatively low concentration of oxygen. Thus, the gas in the lower chamber 38 of tank 19 and in the headspace of silo 1 has a minimum oxygen concentration which will aid in reducing spoilage of the stored material 2.

The effect of the continuous operation of the blower 22 is to maintain a positive pressure in the closed system with respect to the atmosphere. The positive pressure is advantageous in that the nitrogen-enriched gas will tend to flow outwardly through any leaks in the system and when the unloader door 12 is opened, rather than permitting air to flow into the system.

While the above description has shown a recirculating system in which the gas within the silo is continuously recirculated through the gas separating unit, it is contemplated that in some installations a noncirculating system will be employed in which air is introduced to the separator unit and the nitrogen-enriched gas is discharged from the separator to the surge tank and to the silo 1. In a noncirculating system such as this, a check valve would be employed in the lower end of the silo to permit the discharge of gas from the silo to the atmosphere.

Various modes of carrying out the invention are contemplated as being within the scope of the following claims particularly pointing out and distinctly claiming the subject matter which is regarded as the invention.

I claim:

1. In a sealed storage unit, a sealed storage structure for containing a perishable material, gas-separating means including a membrane which is preferentially permeable to oxygen, first conduit means connecting the storage structure with said gas-separating means for supplying a gas mixture from the storage structure containing oxygen to the gas-separating means and exposing the gas mixture to one side of said membrane to cause a portion of the gas mixture to permeate the membrane and provide an oxygen-depleted gas mixture on one side of the membrane and an oxygen-rich gas mixture on the other side of said membrane, second conduit means for introducing the oxygen-depleted gas mixture to the storage structure, a reservoir in said second conduit means to provide a reserve supply of oxygen-depleted gas, said first conduit means, said gas-separating means, said second conduit means and said reservoir comprising a closed flow system, and means for circulating gas within said closed flow system.

2. The unit of claim 1, wherein said first conduit means is connected to the lower end of the storage structure and said second conduit means is connected to the headspace of the storage structure above the level of the material stored therein.

3. The unit of claim 1, and including means in said reservoir for balancing the pressure of said closed flow system with the atmospheric pressure.

4. the unit of claim 3, wherein the means in said reservoir for balancing the pressure in the closed flow system with the atmospheric pressure is a flexible pressure-responsive member, one side of said pressure-responsive member being exposed to the atmosphere and the opposite side of said pressure-responsive member being exposed to the pressure of said closed flow system, flexing of said pressure-responsive member acting to balance pressure differentials between the atmosphere and said closed flow system.

* * * * *